(12) United States Patent
Peng (10) Patent No.: US 11,245,508 B2
(45) Date of Patent: Feb. 8, 2022

(54) CARRIER RESOURCE CONFIGURATION METHOD, UPLINK INFORMATION TRANSMISSION METHOD, BASE STATION AND USER EQUIPMENT

(71) Applicant: Huawei Technologies Co., Ltd., Guangdong (CN)

(72) Inventor: Yan Peng, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 732 days.

(21) Appl. No.: 14/569,319

(22) Filed: Dec. 12, 2014

(65) Prior Publication Data

US 2015/0098441 A1 Apr. 9, 2015

Related U.S. Application Data

(63) Continuation of application No. PCT/CN2012/076794, filed on Jun. 12, 2012.

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/1812* (2013.01); *H04L 1/1893* (2013.01);
(Continued)

(58) Field of Classification Search
CPC ..... H04L 5/0098; H04L 5/0055; H04L 5/001; H04L 5/0032; H04W 72/02; H04W 72/04;
(Continued)

(56) References Cited

U.S. PATENT DOCUMENTS

2010/0215011 A1* 8/2010 Pan ................. H04L 5/0064
370/329
2011/0268087 A1* 11/2011 Kwon .............. H04L 5/0005
370/331
(Continued)

FOREIGN PATENT DOCUMENTS

CN 102164414 A 8/2011
CN 102378370 A 3/2012
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 v10.5.0, Mar. 2012, 54 pages.
(Continued)

*Primary Examiner* — Omer S Mian
(74) *Attorney, Agent, or Firm* — Oblon, McClelland, Maier & Neustadt, L.L.P.

(57) ABSTRACT

Embodiments of the present invention provide a carrier resource configuration method, an uplink information transmission method, a base station, and a user equipment. The configuration method includes: determining, by the base station, a serving cell group to which a serving cell of the UE belongs; and sending, by the base station, a belonging relationship between a serving cell and a serving cell group to the UE, so that the UE performs uplink transmission according to the belonging relationship. The technical solutions of the present invention solve a problem that a UE cannot be scheduled correctly because a base station cannot acquire UCI of the UE in time.

19 Claims, 2 Drawing Sheets

---

A base station determines a serving cell group to which a serving cell of a UE belongs — 101

↓

The base station sends a belonging relationship between a serving cell and a serving cell group to the UE, so that the UE performs uplink transmission according to the foregoing belonging relationship between a serving cell and a serving cell group — 102

(51) Int. Cl.
  *H04L 1/18*   (2006.01)
  *H04W 48/12*  (2009.01)
  *H04W 48/20*  (2009.01)
  *H04L 1/16*       (2006.01)
  *H04W 88/02*      (2009.01)
  *H04W 88/08*      (2009.01)

(52) U.S. Cl.
  CPC .......... *H04L 5/0005* (2013.01); *H04L 5/0032* (2013.01); *H04W 48/12* (2013.01); *H04W 72/042* (2013.01); *H04W 72/0413* (2013.01); *H04L 1/1671* (2013.01); *H04L 1/1887* (2013.01); *H04L 5/001* (2013.01); *H04W 48/20* (2013.01); *H04W 88/02* (2013.01); *H04W 88/08* (2013.01)

(58) Field of Classification Search
  CPC .. H04W 72/0453; H04W 48/12; H04W 48/20
  See application file for complete search history.

(56) References Cited

U.S. PATENT DOCUMENTS

| | | | | |
|---|---|---|---|---|
| 2012/0302245 A1* | 11/2012 | Huang | ............. | H04W 36/0027 |
| | | | | 455/438 |
| 2013/0114508 A1 | 5/2013 | Liang | | |
| 2013/0114568 A1* | 5/2013 | Sagae | ................... | H04W 36/30 |
| | | | | 370/332 |
| 2013/0322397 A1* | 12/2013 | Lee | ................... | H04W 56/0045 |
| | | | | 370/329 |
| 2013/0336262 A1 | 12/2013 | Yang et al. | | |

FOREIGN PATENT DOCUMENTS

| | | | | |
|---|---|---|---|---|
| CN | 102468937 A | 5/2012 | | |
| EP | 2 555 555 A2 | 2/2013 | | |
| JP | WO 2011162134 A1 * | 12/2011 | ............ | H04W 36/30 |
| WO | WO 2011/122911 A2 | 10/2011 | | |
| WO | WO2011134239 * | 11/2011 | | |
| WO | WO 2011/159121 A2 | 12/2011 | | |
| WO | WO 2012/070831 A2 | 5/2012 | | |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 v10.5.0, Mar. 2012, 302 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 11)", 3GPP TS 36.300 v11.1.0, Mar. 2012, 194 pages.

* cited by examiner

CARRIER RESOURCE CONFIGURATION METHOD, UPLINK INFORMATION TRANSMISSION METHOD, BASE STATION AND USER EQUIPMENT

CROSS-REFERENCE TO RELATED APPLICATIONS

This application is a continuation of International Application No. PCT/CN2012/076794, filed on Jun. 12, 2012, which is hereby incorporated by reference in its entirety.

TECHNICAL FIELD

The present invention relates to communications technologies, and in particular, to a carrier resource configuration method, an uplink information transmission method, a base station, and a user equipment.

BACKGROUND

Carrier aggregation (CA) is a new technology in a Long Term Evolution Advanced (LTE-A) system, and is a technology which aggregates multiple carriers to serve a user equipment (User Equipment, UE). In the CA technology, a UE has one primary cell (Primary cell, Pcell) and may have at least one secondary cell (Scell). When the UE needs to feed back uplink control information UCI) in a Scell to a base station, the UCI is transmitted either over a physical uplink shared channel PUSCH) or over a physical uplink control channel PUCCH), where PUCCH transmission is only on a Pcell.

In LTE R10/R11, the CA technology is implemented based on intra-base station (Intra-eNB). When the CA technology is implemented among base stations (Inter-eNB), it is possible that a Scell and a Pcell of a UE exist in different base stations. In this case, UCI of the UE possibly needs to be fed back through a base station to another base station, so that the UE cannot be scheduled correctly according to the UCI because the other base station cannot acquire the UCI of the UE in time, and consequently the UE cannot work normally.

SUMMARY

The present invention provides a carrier resource configuration method, an uplink information transmission method, a base station, and a user equipment, so as to solve a problem that a UE cannot be scheduled correctly because a base station cannot acquire UCI of the UE in time.

According to one aspect, an embodiment of the present invention provides a carrier resource configuration method, and the method includes:

determining, by a base station, a serving cell group to which a serving cell of a user equipment UE belongs; and sending, by the base station, a belonging relationship between the serving cell and the serving cell group to the UE, so that the UE performs uplink transmission according to the belonging relationship.

According to another aspect, an embodiment of the present invention provides an uplink information transmission method, and the method includes:

determining, by a user equipment UE, when there is uplink information to be transmitted, a serving cell group corresponding to the uplink information; and sending, by the UE, the uplink information to abase station by using a serving cell in the serving cell group corresponding to the uplink information.

According to still another aspect, an embodiment of the present invention provides a base station, and the base station includes:

a first determining module, configured to determine a serving cell group to which a serving cell of a user equipment UE belongs; and a first sending module, configured to send a belonging relationship between the serving cell and the serving cell group to the UE, so that the UE performs uplink transmission according to the belonging relationship.

According to yet another aspect, an embodiment of the present invention provides a user equipment, and the user equipment includes:

a second determining module, configured to determine, when there is uplink information to be transmitted, a serving cell group corresponding to the uplink information; and a second sending module, configured to send the uplink information to abase station by using a serving cell in the serving cell group corresponding to the uplink information.

It may be learned from the foregoing that the base station according to the embodiments of the present invention divides serving cells of a UE into multiple serving cell groups, and sends a belonging relationship between a serving cell and a serving cell group to the UE. Therefore, when there is uplink information to be transmitted, the UE may determine a serving cell group corresponding to the uplink information according to the belonging relationship between a serving cell and a serving cell group sent by the base station, and send the uplink information to a base station corresponding to the serving cell group by using a serving cell in the serving cell group corresponding to the uplink information, so that the base station can acquire the uplink information in time and schedule the UE according to the acquired uplink information, thereby solving a problem that a UE cannot be scheduled correctly because a base station cannot acquire uplink information of the UE in time.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

For CA implemented among base stations, if a Scell and a Pcell of a UE are on different base stations, and the UE has uplink information on the Scell and needs to send the uplink information by using the Pcell to a base station in which the Scell is located, the uplink information of the UE needs to be sent by using the Pcell to a base station in which the Pcell is located, and then the base station in which the Pcell is located forwards the foregoing uplink information to the base station in which the Scell is located. Because information interaction between base stations is performed by using an X2 interface, a one-way delay of the information interaction is 10 to 20 milliseconds. It may be learned that the base station in which the Scell is located cannot acquire the foregoing uplink information in time, and consequently the base station in which the Scell is located cannot schedule the UE correctly according to the foregoing uplink information. The following embodiments of the present invention provide solutions to this problem.

Figure 1:
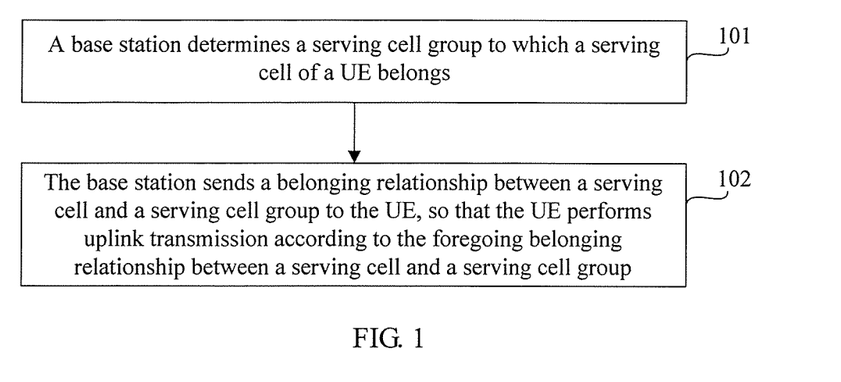
FIG. 1 is a flowchart of a carrier resource configuration method according to an embodiment of the present invention.

FIG. 1 is a flowchart of a carrier resource configuration method according to an embodiment of the present invention. As shown in FIG. 1, the method according to this embodiment includes:

Step 101: A base station determines a serving cell group to which a serving cell of a UE belongs.

Step 102: The base station sends a belonging relationship between the foregoing serving cell and the serving cell group to the UE, so that the UE performs uplink transmission according to the foregoing belonging relationship between the serving cell and the serving cell group.

This embodiment is applicable to various scenarios in which multiple base stations serve a UE. The base station of this embodiment may be any one of the multiple base stations.

Specifically, the base station of this embodiment divides serving cells of the UE into different serving cell groups and then sends a belonging relationship between a serving cell and a serving cell group to the UE. The UE receives the belonging relationship between a serving cell and a serving cell group sent by the base station, locally performs configuration on a serving cell and a serving cell group according to the belonging relationship, and then performs uplink transmission by using the configuration.

A serving cell of the UE refers to a cell that provides a service for the UE, and more specifically, a time-frequency resource in the cell is used for information transmission for the UE. There may be multiple serving cells of a UE, and different serving cells use different cell indexes for distinguishing.

Optionally, that the base station of this embodiment divides serving cells of the UE into different serving cell groups is related to a specific network structure. For example, a non-C-RAN architecture in which base stations are connected by using an X2 interface is different from a C-RAN architecture in which base stations are connected to each other by using a high-speed optical fiber. For a problem that a relatively large transmission delay exists when base stations are connected by using an X2 interface, the base station of this embodiment can classify serving cells deriving from a same base station among serving cells of a UE as one serving cell group. For example, in a non-C-RAN architecture, serving cells of a UE include a cell1, a cell2, a cell3, and a cell4, and corresponding indexes are 1, 2, 3, and 4, respectively; and if the cell1 and the cell2 derives from a first base station, and the cell3 and the cell4 derives from a second base station, the base station of this embodiment can classify the cell1 and the cell2 into a same serving cell group and classify the cell3 and the cell4 as another serving cell group. In this case, when the UE performs uplink transmission by using configuration of a serving cell and a serving cell group, uplink information can be transmitted to a corresponding base station as long as a serving cell group is correctly selected, which helps the base station acquire the uplink information in time. When the uplink information is UCI, the base station may schedule the UE correctly according to the received UCI, thereby solving a problem that a UE cannot be scheduled correctly because UCI cannot be acquired in time. In this embodiment of the present invention, whether the foregoing base station performing CA is a macro base station or a micro base station is not limited. For example, both the foregoing first base station and the second base station may be macro base stations, or one may be a macro base station and the other may be a micro base station respectively, or both may be micro base stations.

For another example, if three base stations A, B, and C serve a UE at the same time, wherein base stations B and C are base stations under a C-RAN architecture, serving cells deriving form base station A may be configured as one serving cell group when the base station of this embodiment configures a serving cell group for serving cells of the UE. However, base station B and base station C are connected to each other by using a high-speed optical fiber, and a transmission rate thereof is relatively high and a delay is relatively low; therefore, serving cells of base stations B and C may be configured as one serving cell group. As an alternative, serving cells of base station B and base station C may also be configured as two serving cell groups.

Optionally, the base station of this embodiment may use an identifier of a serving cell group to distinguish a different serving cell group. That is, an identifier of a serving cell group is unique.

An optional implementation manner in which the base station of this embodiment sends a belonging relationship between a serving cell and a serving cell group to the UE is as follows: The base station of this embodiment uses an identifier of a serving cell group to which a serving cell belongs as an attribute of the serving cell, and sends the identifier together with a cell index of the serving cell to the UE, so as to describe the serving cell group to which the serving cell belongs. It should be noted herein that a cell index of a serving cell is an attribute of the serving cell.

Specifically, in RRC signaling that is used by the base station of this embodiment to add a serving cell for the UE, an optional field is newly added to a description of each serving cell, where the field is used to describe the attribute, namely, an identifier of a serving cell group to which the serving cell belongs. Based on this, when configuring the serving cell, the base station of this embodiment places a cell index of the serving cell and the identifier of the serving cell group to which the serving cell belongs in a field corresponding to the serving cell. When there are multiple serving cells, the base station of this embodiment successively adds a cell index of each serving cell and an identifier of a serving cell group to which the serving cell belongs to a field corresponding to each serving cell in RRC signaling. Then, the base station of this embodiment sends the RRC signaling to the UE. Accordingly, after receiving the RRC signaling, the UE acquires, from the RRC signaling, the cell index of the serving cell and the identifier of the serving cell group to which the serving cell belongs.

Optionally, when a serving cell is added for the UE, if the attribute, namely, the identifier of the serving cell group to which the serving cell belongs, is not described in the RRC signaling, it may be considered that the serving cell belongs to a master cell group (basic CC group). The serving cell group to which the serving cell belongs may be a secondary cell group (Enhancement cc group or additional cc group) or a master cell group. For a master cell group and a secondary cell group, reference may be made to subsequent description.

Further, if the base station of this embodiment needs to modify a serving cell group to which a certain serving cell of the UE belongs, the base station of this embodiment may first delete the serving cell from the RRC signaling and then add the serving cell. When the serving cell is added, a new serving cell group to which the serving cell belongs is indicated.

Another optional implementation manner in which the base station of this embodiment sends a belonging relationship between a serving cell and a serving cell group to the UE is as follows: The base station of this embodiment sends both the identifier of the serving cell group and a cell index list of serving cells included in the serving cell group to the UE. The cell index list includes cell indexes of all serving cells belonging to the serving cell group.

Specifically, the base station of this embodiment may describe related information about the serving cell group in RRC signaling for adding or modifying a serving cell group for the UE, for example, a cell list belonging to the serving cell group. When there are multiple serving cell groups, a serving cell group information list is added to the RRC signaling, and is used to describe related information about the multiple serving cell groups. When the base station of this embodiment configures a serving cell group, an added-serving-cell index list, which is used to describe an index list of serving cells that need to be added to the serving cell group, and/or a deleted-serving-cell index list, which is used to describe an index list of serving cells that need to be deleted from the serving cell group, are included. Then, both the cell index list and the identifier of the serving cell group are added to an information list corresponding to the serving cell group in the RRC signaling. When there are multiple serving cell groups, the base station of this embodiment successively adds an identifier and cell index list of each serving cell group to the information list corresponding to each serving cell group in the RRC signaling. Then, the base station of this embodiment sends the RRC signaling to the UE. Accordingly, after receiving the RRC signaling, the UE acquires, from the RRC signaling, the identifier of the serving cell group and the cell index list of the serving cell group. If the UE finds a cell index of a serving cell from a cell index list of a certain serving cell group, it may be determined that the serving cell belongs to the serving cell group.

Further, if a last serving cell in a serving cell group is also deleted, the serving cell group is also deleted.

Optionally, the foregoing RRC signaling for adding or modifying a serving cell or a serving cell group for the UE may be an RRC connection reconfiguration message (RRC Connection Reconfiguration), to which, however, it is not limited.

Further, the carrier resource configuration method of this embodiment may further include: configuring a primary cell for a serving cell group.

An optional implementation manner of configuring a primary cell for a serving cell group is as follows: The base station of this embodiment configures a serving cell in a serving cell group as the primary cell of the serving cell group, and sends a cell index of the primary cell to the UE by using first RRC signaling, so that the UE determines the primary cell of the serving cell group according to the cell index of the primary cell in the first RRC signaling. In this implementation manner, the base station may configure any serving cell in a serving cell group as a primary cell, which has an advantage of flexible configuration.

It should be noted herein that the base station of this embodiment configuring a primary cell for a serving cell group may be implemented in a same process with the base station of this embodiment sending a belonging relationship between a serving cell and a serving cell group to a UE. In other words, the base station of this embodiment may send, to the UE by using a piece of RRC signaling, the belonging relationship between a serving cell and a serving cell group, together with the cell index of the primary cell of the serving cell group. In addition, the base station of this embodiment configuring a primary cell for a serving cell group and the base station of this embodiment sending a belonging relationship between a serving cell and a serving cell group to a UE may be two different processes.

Another optional implementation manner of configuring a primary cell for a serving cell group is as follows: The base station of this embodiment and the UE pre-agree that a serving cell with a smallest cell index in a serving cell group is a primary cell of the serving cell group. In this implementation manner, the base station and the UE determine a primary cell of a serving cell group in an implicit manner, which helps to save a signaling overhead.

It should be noted herein that another serving cell, except a primary cell, in a serving cell group is called a secondary cell. In a case in which multiple serving cell groups are configured for a UE, each serving cell group needs to include one primary cell, and optionally, further include one or more secondary cells.

Further, in the embodiments of the present invention, both a primary cell and a secondary cell are for a specific serving cell group (Serving Cell Group-specific) of a specific UE, but not for the entire UE (UE-specific). For example, the base station configures, for a certain UE, four member carriers, f0, f1, f2, and f3, which respectively correspond to four serving cells, cell0, cell1, cell2, and cell3. The four serving cells are divided into two serving cell groups, where a serving cell group 1 includes the cell0 and the cell1, and a serving cell group 2 includes the cell2 and the cell3. For the serving cell group 1 of the UE, a primary cell of the serving cell group 1 is the serving cell cell0 corresponding to the carrier f0, and a secondary cell is the serving cell cell1 corresponding to the carrier f1; and for the serving cell group 2 of the UE, a primary cell of the serving cell group 2 is the serving cell cell2 corresponding to the carrier f2, and a secondary cell is the serving cell cell3 corresponding to the carrier f3.

Optionally, in a case in which a control plane and a user plane is separated on the air interface, the base station of this embodiment and the UE may pre-agree that a serving cell group to which a serving cell with a cell index being a preset value belongs is a master cell group, and the serving cell with the cell index being the preset value is also a primary cell of the master cell group. Generally, the preset value is 0. That is, a serving cell group in which a serving cell with a cell index of 0 is located is used as a master cell group, and the serving cell with the cell index of 0 is also a primary cell of the master cell group. The primary cell of the master cell group is generally on a master base station, and a secondary cell may be on a master base station or a secondary base station. Corresponding to a master cell group, another serving cell group may be called a secondary cell group. A primary cell and a secondary cell of a secondary cell group are generally located on the secondary base station. One or more secondary cell groups may be configured for the UE.

In addition, in the primary cell of the master cell group of the UE, the UE either has completed an initial RRC connection establishment process, or has completed an RRC connection re-establishment process, or is indicated a primary cell in a handover process. In other words, the UE can start access only from the primary cell of the master cell group, and changing of the primary cell of the master cell group can be implemented only by using a handover process.

It should be noted herein that, if no serving cell group is configured for the UE, all serving cells of the UE belong to the master cell group.

In the embodiments of the present invention, in a case in which whether a serving cell group is a master cell group or a secondary cell group is not clearly identified, the serving cell group may be a master cell group or may be a secondary cell group, but preferentially is a secondary cell group.

Further, on a basis that a primary cell is configured for a serving cell group (the serving cell group herein may be a master cell group or may be a secondary cell group) of the UE, the carrier resource configuration method according to this embodiment further includes: sending, by the base station of this embodiment, dedicated PUCCH configuration information that is corresponding to the UE and in the primary cell of the serving cell group to the UE by using second RRC signaling.

Generally, multiple UEs exist on a PUCCH of a primary cell, and time-frequency resource occupied by each UE, a manner of using the occupied resource, and the like may be different. To enable each UE to learn information, such as a resource occupied by each UE on the PUCCH of the primary cell, and a manner of using the occupied resource, the base station of this embodiment sends, the dedicated PUCCH configuration information that is corresponding to the UE and in the primary cell of the serving cell group to the UE by using the second RRC signaling. The dedicated PUCCH configuration information corresponding to the UE includes the information, such as the time-frequency resource occupied by the UE on the PUCCH, and the manner of using the occupied resource.

It should be noted herein that the base station of this embodiment configuring a primary cell for a serving cell group by using RRC signaling may be implemented in a same process with the base station of this embodiment delivering dedicated PUCCH configuration information that is corresponding to a UE and in the primary cell to the UE by using RRC signaling. In other words, the base station of this embodiment may send, to the UE, a cell index of the primary cell of the serving cell group, together with the dedicated PUCCH configuration information that is corresponding to the UE and in the primary cell by using a piece of RRC signaling. In addition, the base station of this embodiment configuring a primary cell for a serving cell group by using RRC signaling and the base station of this embodiment delivering, to the UE, the dedicated PUCCH configuration information that is corresponding to the UE and in the primary cell by using RRC signaling may also be different processes.

Based on the foregoing, the base station of this embodiment divides serving cells of the UE into different serving cell groups and delivers a belonging relationship between a serving cell and a serving cell group to the UE, so that the UE can performs uplink transmission according to the belonging relationship. When the UE performs uplink information transmission, the UE may use a serving cell in a serving cell group corresponding to uplink information for transmission. In a same serving cell group, cross-carrier scheduling is allowed; meanwhile, in different serving cell groups, cross-carrier scheduling is not allowed. In this case, the uplink information can directly arrive at a corresponding base station but is not transmitted to another base station, so that the base station can receive the uplink information in time.

Further, when the uplink information is UCI, the base station may schedule the UE according to received UCI, thereby solving a problem that a UE cannot be scheduled correctly because a base station cannot acquire UCI in time.

The following method embodiment in the present invention describes in detail a process that a UE performs uplink information transmission based on a serving cell group.

Figure 2:
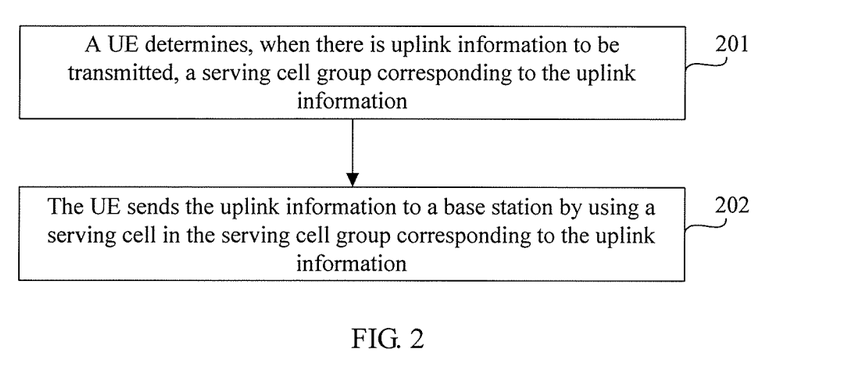
FIG. 2 is a flowchart of an uplink information transmission method according to an embodiment of the present invention.

FIG. 2 is a flowchart of an uplink information transmission method according to an embodiment of the present invention. As shown in FIG. 2, the method according to this embodiment includes:

Step 201: A UE determines, when there is uplink information to be transmitted, a serving cell group corresponding to the uplink information.

Step 202: The UE sends the uplink information to a base station by using a serving cell in the serving cell group corresponding to the uplink information.

In this embodiment, the uplink information may be uplink information of a physical layer, for example, UCI, or may be uplink information of a Media Access Control (MAC) layer, for example, a buffer status report (BSR) or a power headroom report (PHR).

The serving cell group corresponding to the uplink information refers to a serving cell group to which a serving cell that needs to be used for transmitting the uplink information belongs.

After determining the serving cell group corresponding to the uplink information, the UE sends the uplink information to the base station by using a serving cell in the serving cell group corresponding to the uplink information.

In this embodiment, before determining the serving cell group corresponding to the uplink information, the UE has locally configured a serving cell and a serving cell group. Specifically, the UE receives a belonging relationship between a serving cell and a serving cell group sent by the base station; and the UE locally configures a serving cell and a serving cell group according to the belonging relationship between a serving cell and a serving cell group. The belonging relationship between a serving cell and a serving cell group may be represented by a cell index of a serving cell and an identifier of a serving cell group. A cell index of a serving cell may uniquely identify a serving cell, and an identifier of a serving cell group may also uniquely identify a serving cell group.

Optionally, the base station may use an identifier of a serving cell group as an attribute of a serving cell, and send the identifier together with a cell index of the serving cell to the UE. Based on this, an implementation manner in which the UE receives the belonging relationship between a serving cell and a serving cell group sent by the base station is specifically as follows: The UE receives the cell index of the serving cell and the identifier of the serving cell group to which the serving cell belongs, where the cell index and the identifier are used as attributes of the serving cell and sent by the base station.

Optionally, the base station may send, to the UE, the identifier of the serving cell group and a cell index list of serving cells included in the serving cell group at the same time. Based on this, an implementation manner in which the UE receives the belonging relationship between a serving cell and a serving cell group sent by the base station is specifically as follows: The UE receives the identifier of the serving cell group and the cell index list of serving cells included in the serving cell group, where the identifier and the cell index list are sent by the base station.

Optionally, according to a specific network structure, among serving cells of a UE, serving cells deriving from a same base station belong to a same serving cell group, or among serving cells of a UE, serving cells deriving from different base stations may also belong to a same serving cell group. For example, for a non-C-RAN architecture, among serving cells of a UE, serving cells deriving from a same base station belong to a same serving cell group. For a C-RAN architecture, among serving cells of a UE, serving cells deriving from different base stations may belong to a same serving cell group, to which, however, it is not limited, or may belong to different serving cell groups.

In this embodiment, when there is uplink information to be transmitted, the UE determines a serving cell group corresponding to the uplink information, and then sends the uplink information to a corresponding base station by using a serving cell in the serving cell group corresponding to the uplink information, so that the base station can directly receive the uplink information sent by the UE, without forwarding the uplink information by another base station. This improves timeliness of receiving the uplink information by the base station, so that the base station can schedule the UE correctly according to the received uplink information, thereby solving a problem that a UE cannot be scheduled correctly because a base station cannot receive uplink information in time.

That the uplink information is uplink information of a physical layer is used as an example in the following to describe, with examples, a manner in which the UE determines a serving cell group corresponding to the uplink information.

When the uplink information is a hybrid automatic repeat request-acknowledgement (HARQ-ACK), the UE determines that a serving cell group to which a serving cell belongs is the serving cell group corresponding to the uplink information, where physical downlink shared channel (PDSCH) transmission corresponding to the HARQ-ACK is in the serving cell;

Specifically, when receiving the PDSCH, the UE needs to feed back the HARQ-ACK. In this case, the HARQ-ACK needs to be fed back to a base station that sends the PDSCH. Therefore, a serving cell group corresponding to the HARQ-ACK is a serving cell group formed by serving cells of the base station that sends the PDSCH, that is, a serving cell group to which a serving cell, in which the PDSCH is located, belongs.

When the uplink information is a scheduling request (Schedule Request, SR), the UE determines that a serving cell group to which a serving cell, associated with a requested-for-transmission MAC protocol data unit (Protocol Data Unit, PDU), belongs is the serving cell group corresponding to the uplink information.

Specifically, when the UE has an uplink MAC PDU to be transmitted but has no chance to implement PUSCH transmission, the UE sends an SR to a base station, so as to request the base station to schedule PUSCH transmission. The uplink MAC PDU may be: uplink data of a data radio bearer (DRB), where the uplink data of the DRB is generated by an Internet Protocol (IP) layer of the UE, and arrives at a MAC layer to form an MAC PDU after being processed by the Packet Data Convergence Protocol (PDCP) layer and Radio Link Control (RLC) layer. The uplink MAC PDU may further be: control signaling of the MAC layer, for example, a BSR or a PHR. The control signaling of the MAC layer is generally generated by the MAC layer of the UE when a certain condition (for example, triggered in a periodical or an event-based manner) is met. Moreover, the uplink MAC PDU may also include both the uplink data of the DRB and the control signaling of the MAC layer.

The MAC PDU needs to be transmitted to a certain base station, and the SR is used to request the base station to perform PUSCH scheduling on the MAC PDU. Therefore, a serving cell group corresponding to the SR is a serving cell group formed by serving cells of a base station to which the MAC PDU needs to be transmitted.

When the uplink information is periodic channel state information (CSI), the UE determines that a serving cell group to which a serving cell, to which the periodic CSI belongs, belongs is the serving cell group corresponding to the uplink information.

It should be noted herein that the foregoing uplink information of a physical layer, such as an HARQ-ACK, a MAC PDU, or periodic CSI, is generally packed into UCI, and transmitted to the base station by using a PUSCH or a PUCCH.

That the uplink information is uplink information of an MAC is used as an example in the following to describe, with examples, a manner in which the UE determines a serving cell group corresponding to the uplink information.

When the uplink information is a BSR, the UE determines that a serving cell group to which a serving cell, associated with an uplink logical channel corresponding to the BSR, belongs is the serving cell group corresponding to the uplink information.

Each radio bearer (RB) has a uniquely corresponding logical channel. Logical channels may be grouped, and a UE can have a maximum of 4 logical channel groups. The UE notifies the base station, by using a BSR, of an amount of uplink data to be transmitted over each logical channel of the UE, so that the base station schedules uplink data for the UE. A logical channel corresponding to a RB is an uplink logical channel corresponding to the BSR. Optionally, each RB may be bound to (or associated with) a certain base station for transmission, which is equivalent to that a logical channel corresponding to the RB is bound to (or associated with) a certain serving cell group (which is, more specifically, a certain serving cell). Based on this, the BSR corresponding to the logical channel can be transmitted in the uplink only in a serving cell group to which a serving cell associated with the logical channel belongs.

When the uplink information is a PHR, the UE determines that a serving cell group to which a serving cell associated with the PHR belongs is the serving cell group corresponding to the uplink information.

For transmission by the UE in each serving cell, the base station configures a maximum uplink transmission power for the UE. A PHR is used to report, to the base station, a difference between an uplink transmission power (which generally refers to a transmission power over a PUSCH, where a power used by a PUCCH is further added if the transmission is performed in a primary cell) of the UE and the maximum uplink transmission power on a serving cell. When scheduling uplink transmission of the UE, the base station may adjust a modulation scheme and code scheme of the uplink transmission according to the difference reported by the PHR, so as to ensure that a bit error rate of the uplink transmission is in a controllable range. It may be learned that a serving cell whose power difference is reported by the PHR is a serving cell associated with the PHR.

Further, in this embodiment, the UE may configure a primary cell for a serving cell group. An optional implementation manner in which the UE configures a primary cell for a serving cell group includes: The UE receives first RRC signaling sent by the base station, and configures a primary cell for a serving cell group according to the first RRC signaling. The first RRC signaling includes a cell index of the primary cell of the serving cell group. In this implementation manner, the base station selects a serving cell in the serving cell group as the primary cell of the serving cell group, and sends the cell index of the primary cell to the UE by using the first RRC signaling. A configured primary cell can be determined by the base station, which has an advantage of flexible configuration.

It should be noted herein that the UE configuring a primary cell for a serving cell group may be implemented in a same process with the UE receiving a belonging relationship between a serving cell and a serving cell group sent by the base station. In other words, the UE may receive a piece of RRC signaling sent by the base station, where the RRC signaling includes both the belonging relationship between a serving cell and a serving cell group, and the cell index of the primary cell of the serving cell group. In addition, the processes of the UE configuring the primary cell for the serving cell group and the UE receiving the belonging relationship between a serving cell and a serving cell group sent by the base station may also be different processes.

Another optional implementation manner in which the UE configures a primary cell for a serving cell group includes: The UE and the base station pre-agree that a serving cell with a smallest cell index in a serving cell group is the primary cell of the serving cell group.

It should be noted herein that another serving cell, except a primary cell, in a serving cell group may be called a secondary cell.

Further, on a basis of configuring the primary cell for the serving cell group, the UE of this embodiment may further receive second RRC signaling sent by the base station, and determine, according to the second RRC signaling, information such as resource occupied by the UE over a PUCCH of the primary cell of the serving cell group, and a manner of using the occupied resource. The second RRC signaling includes dedicated PUCCH configuration information that is corresponding to the UE and in the primary cell. The dedicated PUCCH configuration information that is corresponding to the UE and in the primary cell includes the information such as the resource occupied by the UE over the PUCCH of the primary cell and the manner of using the occupied resource. In this case, when performing uplink transmission over the PUCCH of the primary cell of the serving cell group, the UE may perform uplink transmission over the PUCCH of the primary cell according to corresponding dedicated PUCCH configuration information.

The following describes a process in which the UE sends uplink information to the base station by using a serving cell in a serving cell group corresponding to the uplink information according to this embodiment of the present invention. The process in which the UE sends uplink information to the base station by using a serving cell in a serving cell group corresponding to the uplink information is also a process in which the UE performs uplink transmission by using configuration of a serving cell and a serving cell group. Specifically, the following cases are included:

The first case: The UE is not configured to allow simultaneous transmission of a PUCCH and a PUSCH. Specifically, in the first case:

if the UE has PUSCH transmission in the serving cell group corresponding to the uplink information in a current transmission time interval (Transmission Time Interval, TTI), the UE sends the uplink information to the base station over a PUSCH of a serving cell with a smallest cell index in the serving cell group corresponding to the uplink information. Specifically, the foregoing serving cell with the smallest cell index refers to a serving cell with a smallest cell index, among serving cells that have PUSCH transmission in the current TTI, in the serving cell group corresponding to the uplink information.

If the UE has no PUSCH transmission in the serving cell group corresponding to the uplink information in the current TTI, the UE sends the uplink information to the base station over a PUCCH of a primary cell of the serving cell group corresponding to the uplink information. It should be noted herein that a primary cell of each serving cell group in the embodiments of the present invention may have PUCCH transmission.

It should be noted herein that, in the first case, when a primary cell needs to be used for transmission, the uplink information refers to UCI of a physical layer, and if a secondary cell is used for transmission, specific type of the uplink information specifically is not limited.

The second case: The UE is configured to allow simultaneous transmission of a PUCCH and a PUSCH. Specifically, in the second case:

if the uplink information only includes an HARQ-ACK, or an SR, or periodic CSI, or both an HARQ-ACK and an SR, the UE sends the uplink information to the base station over the PUCCH of the primary cell of the serving cell group corresponding to the uplink information. Because an amount of information of an HARQ-ACK, or an SR, or periodic CSI is not large, when the uplink information includes only an HARQ-ACK, or an SR, or periodic CSI, the uplink information can be transmitted over the PUCCH. In addition, because an amount of information of an SR and an HARQ-ACK is smaller relatively, and the amount of information is not large even when the uplink information includes both an HARQ-ACK and an SR, the uplink information can also be transmitted over the PUCCH.

If the uplink information includes both an HARQ-ACK and periodic CSI, the following cases may further be classified:

(1) When there is no PUSCH transmission in the serving cell group corresponding to the uplink information (that is, there is no PUSCH transmission in any serving cell of the serving cell group corresponding to the uplink information), if the base station is preconfigured to allow simultaneous transmission of an HARQ-ACK and periodic CSI, and the HARQ-ACK corresponds to only one PDSCH, the UE simultaneously sends the HARQ-ACK and the periodic CSI to the base station over the PUCCH of the primary cell of the serving cell group corresponding to the uplink information; and if the base station is preconfigured to not allow simultaneous transmission of an HARQ-ACK and periodic CSI, or the HARQ-ACK corresponds to multiple PDSCHs, the UE sends only the HARQ-ACK to the base station over the PUCCH of the primary cell of the serving cell group corresponding to the uplink information (that is, the periodic CSI is discarded).

(2) When there is PUSCH transmission in the primary cell of the serving cell group corresponding to the uplink information, the UE sends the HARQ-ACK to the base station over the PUCCH of the primary cell of the serving cell group corresponding to the uplink information, and sends the periodic CSI to the base station over the PUSCH of the primary cell of the serving cell group corresponding to the uplink information.

(3) When there is no PUSCH transmission in the primary cell of the serving cell group corresponding to the uplink information, but there is PUSCH transmission in a secondary cell of the serving cell group corresponding to the uplink information (that is, there is no PUSCH transmission in the primary cell of the serving cell group corresponding to the uplink information, but there is PUSCH transmission in at least one secondary cell), the UE sends the HARQ-ACK to the base station over the PUCCH of the primary cell of the serving cell group corresponding to the uplink information, and sends the periodic CSI to the base station over a PUSCH of a serving cell with a smallest cell index among secondary cells in the serving cell group corresponding to the uplink information. The serving cell with the smallest cell index herein refers to a serving cell with a smallest cell index, among serving cells that have PUSCH transmission, in the serving cell group corresponding to the uplink information.

Further, in the foregoing process, a process in which the UE sends the uplink information or the HARQ-ACK in the foregoing uplink information to the base station over the PUCCH of the primary cell of the serving cell group corresponding to the uplink information includes: The UE sends, according to dedicated PUCCH configuration information that is corresponding to the UE and in the primary cell of the serving cell group corresponding to the uplink information, the uplink information or the HARQ-ACK in the uplink information to the base station over the PUCCH of the primary cell of the serving cell group corresponding to the uplink information. Specifically, the UE determines, according to the dedicated PUCCH configuration information that is corresponding to the UE and in the primary cell of the serving cell group corresponding to the uplink information, a resource occupied by the UE over the PUCCH of the primary cell of the serving cell group corresponding to the uplink information, and a manner of using the occupied resource, and according to the determined manner of using the resource, sends the uplink information or the HARQ-ACK in the uplink information to the base station on the determined PUCCH.

Optionally, the UE snoops only on a primary cell with a cell index being a preset value, so as to receive a system message sent by the base station. The primary cell with a cell index being a preset value refers to a serving cell on a master base station. Generally, the preset value is 0, to which, however, it is no limited. That is, the UE snoops only on a primary cell of the master base station, and receives a system message broadcasted by the master base station. However, a secondary base station does not have a function of system message broadcasting. Therefore, the UE may not snoop a primary cell on the secondary base station, which helps to alleviate snooping load of the UE.

Further, serving cell groups may further be classified into a master cell group and a secondary cell group. The master cell group refers to a serving cell group with a primary cell on a master base station. A secondary cell in a master cell group is also on the master base station. The secondary cell group refers to a serving cell group with a primary cell on a secondary base station, and generally, a secondary cell in the secondary cell group is on the secondary base station.

It may be learned from the foregoing that, according to the uplink information transmission method provided in this embodiment, when there is uplink information to be transmitted, the UE determines a serving cell group corresponding to the uplink information by using local configuration of a serving cell and a serving cell group, and then sends the uplink information to a corresponding base station by using a serving cell in the serving cell group corresponding to the uplink information, so that the base station can directly receive the uplink information sent by the UE, without forwarding the uplink information by another base station. This improves timeliness of receiving the uplink information by the base station, so that the base station can schedule the UE correctly according to the received uplink information, thereby solving a problem that a UE cannot be scheduled correctly because a base station cannot receive uplink information in time.

Figure 3:
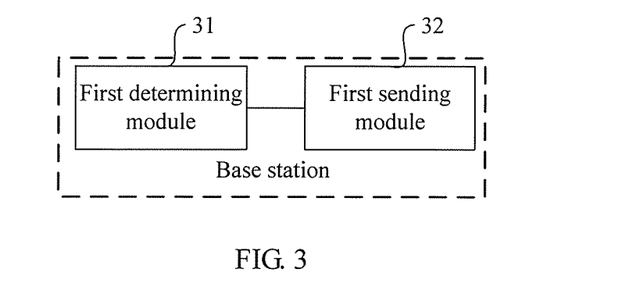
FIG. 3 is a schematic structural diagram of a base station according to an embodiment of the present invention.

FIG. 3 is a schematic structural diagram of a base station according to an embodiment of the present invention. As shown in FIG. 3, the base station according to this embodiment includes: a first determining module 31 and a first sending module 32.

The first determining module 31 is configured to determine a serving cell group to which a serving cell of a UE belongs. The first sending module 32 is connected to the first determining module 31 and configured to send a belonging relationship between the serving cell and the serving cell group that is determined by the first determining module 31 to the UE, so that the UE performs uplink transmission according to the belonging relationship.

A serving cell of the UE refers to a cell that provides a service for the UE, and more specifically, time-frequency resource in the cell is used for information transmission for the UE. There may be multiple serving cells of a UE, and different serving cells use different cell indexes for distinguishing.

For example, for a non-C-RAN architecture, the first determining module 31 specifically may divide serving cells, deriving from a same base station, among serving cells of a UE into one serving cell group. For a C-RAN architecture, the first determining module 31 specifically may divide, serving cells, deriving from different base stations, among serving cells of a UE into one serving cell group or into multiple serving cell groups.

Functional module of the base station provided in this embodiment may be used to execute a corresponding process in the foregoing carrier resource configuration method embodiment, and a specific working principle of the functional modules is not repeatedly described.

According to the base station provided in this embodiment, serving cells, of different base stations, among serving cells of a UE are divided into different serving cell groups, and a belonging relationship between a serving cell and a serving cell group is sent to the UE, so that the UE can perform uplink transmission according to the belonging relationship, and UCI of the UE can directly arrive at a corresponding base station, instead of being transmitted to another base station and then forwarded by the another base station. Therefore, the base station can receive the UCI in time, and schedule the UE according to the received UCI, thereby solving a problem that a UE cannot be scheduled correctly because a base station cannot acquire UCI of the UE in time.

Figure 4:
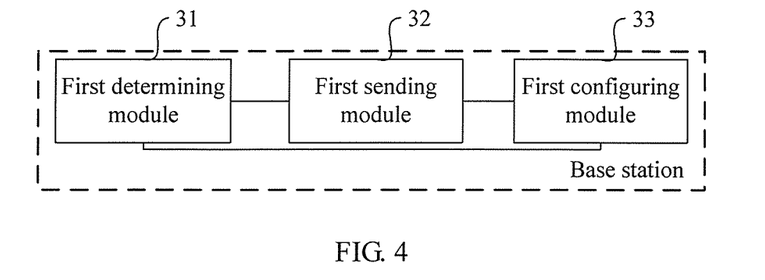
FIG. 4 is a schematic structural diagram of a base station according to another embodiment of the present invention.

FIG. 4 is a schematic structural diagram of a base station according to another embodiment of the present invention. This embodiment is implemented based on the embodiment shown in FIG. 3. As shown in FIG. 4, the base station according to this embodiment includes: a first determining module 31 and a first sending module 32.

Optionally, in this embodiment, an identifier of a serving cell group may be used to distinguish a different serving cell group. That is, an identifier of a different serving cell group is unique.

In this embodiment, the first sending module 32 may be specifically configured to use an identifier of a serving cell group as an attribute of a serving cell, and send the identifier together with a cell index of the serving cell to the UE. For example, the first sending module 32 may newly add, in RRC signaling that is used to add a serving cell for the UE, an optional field to a description of each serving cell, where the field is used to describe the attribute, namely, an identifier of a serving cell group to which the serving cell belongs; place, in a field corresponding to the serving cell, a cell index of the serving cell and the identifier of the serving cell group to which the serving cell belongs; and then send the RRC signaling to the UE. For another example, if a serving cell group to which a certain serving cell of the UE belongs needs to be modified, the first sending module 32 may first delete the serving cell from the RRC signaling and then add the serving cell. When the serving cell is added, a new serving cell group to which the serving cell belongs is indicated; or the first sending module 32 may be specifically configured to send both the identifier of the serving cell group and a cell index list of serving cells included in the serving cell group to the UE. For example, the first sending module 32 may describe related information about the serving cell group in RRC signaling for adding or modifying a serving cell group for the UE, for example, a cell list belonging to the serving cell group. When a serving cell group is configured, the first sending module 32 newly adds a cell index list for the serving cell group, then, adds both the cell index list and an identifier of the serving cell group to an information list corresponding to the serving cell group in the RRC signaling, and then sends the RRC signaling to the UE.

The foregoing RRC signaling for adding or modifying a serving cell or a serving cell group for the UE may be an RRC connection reconfiguration message, to which, however, it is not limited.

Further, the base station of this embodiment may further include: a first configuring module 33.

The first configuring module 33 is configured to configure a serving cell in the serving cell group as a primary cell of the serving cell group. Optionally, the first configuring module 33 is connected to the first determining module 31 and the first sending module 32.

The first sending module 32 is further configured to send a cell index of a primary cell configured by the first configuring module 33 to the UE by first RRC signaling, so that the UE determines the primary cell of the serving cell group according to the cell index of the primary cell.

Optionally, the first sending module 32 may send, to the UE by using a piece of RRC signaling, a belonging relationship between a serving cell and a serving cell group that is determined by the first determining module 31, together with the cell index that is of the primary cell of the serving cell group and configured by the first configuring module 33.

Optionally, the base station of this embodiment and the UE may further pre-agree that a serving cell with a smallest cell index in the serving cell group is a primary cell of a serving cell group. This implicit manner of determining a primary cell of a serving cell group helps to save a signaling overhead.

On a basis of configuring a primary cell for a serving cell group in the foregoing, the first configuring module 33 may be further configured to configure dedicated PUCCH configuration information in the primary cell for the UE. The first sending module 32 is further configured to deliver dedicated PUCCH configuration information that is corresponding to the UE and in the primary cell to the UE by using second RRC signaling.

Optionally, the first sending module 32 may send, to the UE by using apiece of RRC signaling, the cell index of the primary cell of the serving cell group that is configured by the first configuring module 33, together with the dedicated PUCCH configuration information that is corresponding to the UE in the primary cell and configured by the first configuring module 33.

Optionally, the base station of this embodiment may further pre-agree with the UE that a serving cell group to which a serving cell with a cell index being a preset value belongs is a master cell group. Generally, the preset value may be 0. That is, a serving cell group to which a serving cell with a cell index of 0 belongs is used as a master cell group. A primary cell of a master cell group is on a master base station, and a serving cell in an secondary cell group is on a secondary base station.

The foregoing functional modules may be used to execute a corresponding process in the foregoing carrier resource configuration method embodiment, and a specific working principle of the foregoing functional modules is not repeatedly described. For details, refer to description in the method embodiment.

According to the base station provided in this embodiment, serving cells, of different base stations, among serving cells of a UE are divided into different serving cell groups, and a belonging relationship between a serving cell and a serving cell group is sent to the UE, so that the UE can perform uplink transmission according to the belonging relationship, and UCI of the UE can directly arrive at a corresponding base station, instead of being transmitted to another base station and then forwarded by the another base station. Therefore, the base station can receive the UCI in time, and schedule the UE according to the received UCI, thereby solving a problem that a UE cannot be scheduled correctly because a base station cannot acquire UCI of the UE in time.

Figure 5:
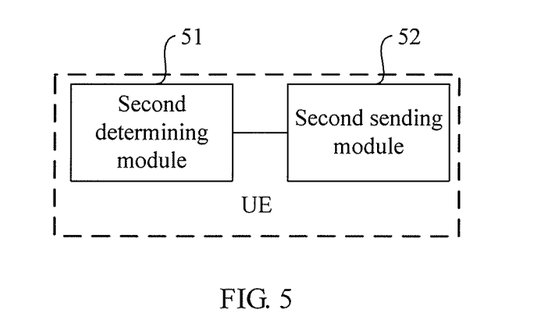
FIG. 5 is a schematic structural diagram of a UE according to an embodiment of the present invention.

FIG. 5 is a schematic structural diagram of a UE according to an embodiment of the present invention. As shown in FIG. 5, the UE of this embodiment includes: a second determining module 51 and a second sending module 52.

The second determining module 51 is configured to determine, when there is uplink information to be transmitted, a serving cell group corresponding to the uplink information. The second sending module 52 is connected to the second determining module 51 and configured to send the uplink information to a base station by using a serving cell in the serving cell group that is corresponding to the uplink information and determined by the second determining module 51.

The uplink information may be uplink information of a physical layer, for example, UCI, or may be uplink information of a MAC layer, for example, a BSR and a PHR.

The serving cell group corresponding to the uplink information refers to a serving cell group to which a serving cell that needs to be used for transmitting the uplink information belongs.

Functional modules of the UE provided by this embodiment may be used to execute a corresponding process in the foregoing uplink information transmission method embodiment, and a specific working principle of the functional modules is not repeatedly described. For details, refer to description in the method embodiment.

In this embodiment, when there is uplink information to be transmitted, the UE determines a serving cell group corresponding to the uplink information, and then sends the uplink information to a corresponding base station by using a serving cell in the serving cell group corresponding to the uplink information, so that the base station can directly receive the uplink information sent by the UE, without forwarding the uplink information by another base station. This improves timeliness of receiving the uplink information by the base station, so that the base station can schedule the UE correctly according to the received uplink information, thereby solving a problem that a UE cannot be scheduled correctly because a base station cannot receive uplink information in time.

Figure 6:
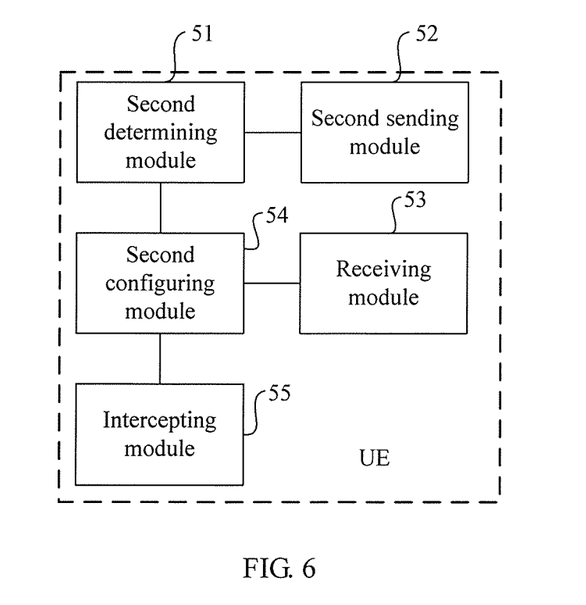
FIG. 6 is a schematic structural diagram of a UE according to another embodiment of the present invention.

FIG. 6 is a schematic structural diagram of a UE according to another embodiment of the present invention. This embodiment is implemented based on the embodiment shown in FIG. 5. As shown in FIG. 6, the UE of this embodiment further includes a receiving module 53 and a second configuring module 54 in addition to a second determining module 51 and a second sending module 52.

The receiving module 53 is configured to receive a belonging relationship between a serving cell and a serving cell group sent by a base station.

The second configuring module 54 is connected to the receiving module 53 and configured to locally configure a serving cell and a serving cell group according to the belonging relationship that is between a serving cell and a serving cell group and is received by the receiving module 53. The second configuring module 54 is further connected to the second determining module 51 and configured to provide local configuration of a serving cell and a serving cell group for the second determining module 51, so that the second determining module 51, according to the configuration, determines a serving cell group corresponding to uplink information.

In this embodiment, according to different uplink information, a process or manner of determining a corresponding serving cell group for uplink information by the second determining module 51 is different. Specifically, the second determining module 51 may be configured to determine, when the uplink information is an HARQ-ACK, that a serving cell group to which a serving cell belongs is the serving cell group corresponding to the uplink information, where PDSCH transmission corresponding to the HARQ-ACK is in the serving cell; or the second determining module 51 may be specifically configured to determine, when the uplink information is an SR, that a serving cell group to which a serving cell, associated with a requested-for-transmission MAC PDU, belongs is the serving cell group corresponding to the uplink information; or the second determining module 51 may be specifically configured to determine, when the uplink information is periodic CSI, that a serving cell group to which a serving cell, to which the periodic CSI belongs, belongs is the serving cell group corresponding to the uplink information; or the second determining module 51 may be specifically configured to determine, when the uplink information is a BSR, that a serving cell group to which a serving cell, associated with an uplink logical channel corresponding to the BSR, belongs is the serving cell group corresponding to the uplink information; or the second determining module 51 specifically may be specifically configured to determine, when the uplink information is a PHR, that a serving cell group to which a serving cell, associated with the PHR, belongs is the serving cell group corresponding to the uplink information.

The receiving module 53 may be specifically configured to receive a cell index of the serving cell and an identifier of the serving cell group to which the serving cell belongs, where the cell index and the identifier are used as attributes of the serving cell and sent by the base station, so as to achieve an objective of receiving a belonging relationship between a serving cell and a serving cell group; or the receiving module 53 may be specifically configured to receive an identifier of the serving cell group and a cell index list of serving cells included in the serving cell group, where the identifier and the cell index list are sent by the base station, so as to achieve an objective of receiving a belonging relationship between a serving cell and a serving cell group.

Further, the receiving module 53 may be further configured to receive first RRC signaling sent by the base station, where the first RRC signaling includes a cell index of a primary cell of a serving cell group. Accordingly, the second configuring module 54 is further configured to configure a primary cell of the cell service group according to the first RRC signaling.

Optionally, the receiving module 53 may receive, by using a piece of RRC signaling, both an belonging relationship between a serving cell and a serving cell group sent by the base station and a cell index that is of a primary cell of a serving cell group and sent by the base station.

Further, the receiving module 53 is further configured to receive second RRC signaling sent by the base station, where the second RRC signaling includes dedicated PUCCH configuration information that is corresponding to the UE and in a primary cell.

Optionally, the receiving module 53 may receive, by using a piece of RRC signaling, both a cell index, which is of a primary cell of a serving cell group and sent by the base station, and dedicated PUCCH configuration information that is corresponding to the UE and in the primary cell, where the dedicated PUCCH configuration information is sent by the base station.

Specifically, in a case in which the UE is not configured to allow simultaneous transmission of a PUCCH and a PUSCH: if there is a PUSCH in the serving cell group corresponding to the uplink information in a current transmission time interval, the second sending module 52 may be specifically configured to send the uplink information to the base station over a PUSCH of a serving cell with a smallest cell index in the serving cell group corresponding to the uplink information; and if there is no PUSCH in the serving cell group corresponding to the uplink information in the current transmission time interval, the second sending module 52 may be specifically configured to send the uplink information to the base station over a PUCCH of a primary cell of the serving cell group corresponding to the uplink information.

In a case in which the UE is configured to allow simultaneous transmission of a PUCCH and a PUSCH: if the uplink information includes an HARQ-ACK, or an SR, or periodic CSI, or both an HARQ-ACK and an SR, the second sending module 52 may be specifically configured to send the uplink information to the base station over the PUCCH of the primary cell of the serving cell group corresponding to the uplink information; and if the uplink information includes both an HARQ-ACK and periodic CSI, when there is no PUSCH transmission in the serving cell group corresponding to the uplink information: if the base station is preconfigured to allow simultaneous transmission of an HARQ-ACK and periodic CSI, and the HARQ-ACK corresponds to only one PDSCH, the second sending module 52 may be specifically configured to send the uplink information to the base station over the PUCCH of the primary cell of the serving cell group corresponding to the uplink information at the same time; and if the base station is preconfigured not to allow simultaneous transmission of an HARQ-ACK and periodic CSI, or the HARQ-ACK corresponds to multiple PDSCHs, the second sending module 52 specifically may send only the HARQ-ACK to the base station over the PUCCH of the primary cell of the serving cell group corresponding to the uplink information; when there is PUSCH transmission in the primary cell of the serving cell group corresponding to the uplink information, the second sending module 52 may be specifically configured to send the HARQ-ACK to the base station over the PUCCH of the primary cell of the serving cell group corresponding to the uplink information, and send the periodic CSI to the base station over a PUSCH of the primary cell of the serving cell group corresponding to the uplink information; and when there is no PUSCH transmission in the primary cell of the serving cell group corresponding to the uplink information, but there is PUSCH transmission in a secondary cell of the serving cell group corresponding to the uplink information, the second sending module 52 may be specifically configured to send the HARQ-ACK to the base station over the PUCCH of the primary cell of the serving cell group corresponding to the uplink information, and send the periodic CSI to the base station over a PUSCH of a serving cell with a smallest cell index among secondary cells in the serving cell group corresponding to the uplink information.

Based on the foregoing, the second sending module 52 is more specifically configured to send, according to dedicated PUCCH configuration information that is corresponding to the UE and in the primary cell of the serving cell group corresponding to the uplink information, the uplink information or the HARQ-ACK in the uplink information to the base station over the PUCCH of the primary cell of the serving cell group corresponding to the uplink information.

Further, the UE of this embodiment may further include: an snooping module 55. The snooping module 55 is configured to snoop only on a primary cell with a cell index being a preset value, so as to receive a system message sent by the base station. Optionally, the snooping module 55 is connected to the second configuring module 54 and configured to obtain, from the second configuring module 54, a cell index of a primary cell of a master cell group (that is, to determine a primary cell that needs to be snooped).

The foregoing functional modules may be used to execute a corresponding process in the foregoing uplink information transmission method embodiment, and a specific working principle of the functional modules is not repeatedly described. For details, refer to description in the method embodiment.

When there is uplink information to be transmitted, the UE of this embodiment determines a serving cell group corresponding to the uplink information by using local configuration of a serving cell and a serving cell group, and then sends the uplink information to a corresponding base station by using a serving cell in the serving cell group corresponding to the uplink information, so that the base station can directly receive the uplink information sent by the UE, without forwarding the uplink information by another base station. This improves timeliness of receiving the uplink information by the base station, so that the base station can schedule the UE correctly according to the received uplink information, thereby solving a problem that a UE cannot be scheduled correctly because a base station cannot receive uplink information in time.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A user equipment (UE), comprising;
a receiver configured to receive a first message for adding a first serving cell and a second message for adding a second serving cell from a base station, wherein the first serving cell belongs to a master serving cell group when a identifier of a serving cell group to which the first serving cell belongs is not described in the first message, wherein the second serving cell belongs to a secondary serving cell group when the second message comprises a field indicating the secondary serving cell group to which the second serving cell belongs;
a processor configured to locally configure the master serving cell group according to the first message and locally configure the secondary serving cell group according to the second message, wherein a primary cell of the master serving cell group is configured with a cell index being a preset value; and determine, when there is uplink information to be transmitted, a serving cell group corresponding to the uplink information; and
a transmitter configured to send the uplink information to a base station through a serving cell in the serving cell group corresponding to the uplink information,
wherein when the serving cell group corresponding to the uplink information is the secondary serving cell group, the uplink information is sent through a primary cell of the serving cell group, and when the serving cell group corresponding to the uplink information is the master serving cell group, the uplink information is sent through the primary cell of the master serving cell group.

2. The UE according to claim 1, wherein the processor is configured to:
determine, when the uplink information is a hybrid automatic repeat request-acknowledgement (HARQ-ACK), that a serving cell group to which a serving cell belongs is the serving cell group corresponding to the uplink information, wherein physical downlink shared channel (PDSCH) transmission corresponding to the HARQ-ACK is in the serving cell; or determine, when the uplink information is a scheduling request (SR), that a serving cell group to which a serving cell, associated with a requested-for-transmission Media Access Control (MAC) protocol data unit (PDU), belongs is the serving cell group corresponding to the uplink information; or determine, when the uplink information is periodic channel state information (CSI), that a serving cell group to which a serving cell, to which the periodic CSI belongs, belongs is the serving cell group corresponding to the uplink information.

3. The UE according to claim 1, wherein the processor is configured to:

determine, when the uplink information is a buffer status report (BSR), that a serving cell group to which a serving cell, associated with an uplink logical channel corresponding to the BSR, belongs is the serving cell group corresponding to the uplink information; or determine, when the uplink information is a power headroom report (PHR), that a serving cell group to which a serving cell, associated with the PHR, belongs is the serving cell group corresponding to the uplink information.

4. The UE according to claim 1, wherein the receiver is further configured to:

receive, in a primary cell of the serving cell group through the a RRC signaling, dedicated physical uplink control channel (PUCCH) configuration information that is corresponding to the UE.

5. The UE according to claim 1, wherein the receive is further configured to:

receive a third message from the base station, wherein the third message comprises a field corresponding to the secondary serving cell group, and the field comprises cell indexes of the primary cell and a secondary cell in the secondary serving cell group and an identifier of the secondary serving cell group, wherein the primary cell and the secondary cell belonging to the secondary serving cell group are derived from a single base station.

6. An uplink information transmission method, comprising:

receiving, by a user equipment UE from a base station, a message that comprises a field corresponding to a secondary serving cell group to which a serving cell of the UE belongs, and the field comprises cell indexes of a primary cell and a secondary cell in the secondary serving cell group and an identifier of the secondary serving cell group, wherein the primary cell and the secondary cell belonging to the secondary serving cell group are derived from a single base station;

determining, by the UE when there is uplink information to be transmitted, a serving cell group corresponding to the uplink information according to the message, wherein serving cells in the serving cell group corresponding to the uplink information are derived from a single base station; and, sending, by the UE, the uplink information to a base station through a serving cell in the serving cell group corresponding to the uplink information, wherein when the serving cell group corresponding to the uplink information is the secondary serving cell group, the uplink information is sent through the primary cell of the serving cell group, and when the serving cell group corresponding to the uplink information is a master serving cell group, the uplink information is sent through a primary cell of the master serving cell group, and wherein a serving cell group to which a serving cell with a cell index being a preset value belongs is a master serving cell group, and another serving cell group is the secondary serving cell group.

7. The method according to claim 6, wherein determining the serving cell group corresponding to the uplink information comprises:

determining, when the uplink information is a hybrid automatic repeat request-acknowledgement (HARQ-ACK), that a serving cell group to which a serving cell belongs is the serving cell group corresponding to the uplink information, wherein physical downlink shared channel (PDSCH) transmission corresponding to the HARQ-ACK is in the serving cell.

8. The method according to claim 6, wherein determining the serving cell group corresponding to the uplink information comprises:

determining, when the uplink information is a scheduling request (SR), that a serving cell group to which a serving cell, associated with a requested-for-transmission Media Access Control (MAC) protocol data unit (PDU), belongs is the serving cell group corresponding to the uplink information.

9. The method according to claim 6, wherein determining the serving cell group corresponding to the uplink information comprises:

determining, when the uplink information is periodic channel state information (CSI), that a serving cell group to which a serving cell, to which the periodic CSI belongs, belongs is the serving cell group corresponding to the uplink information.

10. The method according to claim 6, wherein determining the serving cell group corresponding to the uplink information comprises:

determining, when the uplink information is a buffer status report (BSR), that a serving cell group to which a serving cell, associated with an uplink logical channel corresponding to the BSR, belongs is the serving cell group corresponding to the uplink information.

11. The method according to claim 6, wherein determining the serving cell group corresponding to the uplink information comprises:

determining, when the uplink information is a power headroom report (PHR), that a serving cell group to which a serving cell, associated with the PHR, belongs is the serving cell group corresponding to the uplink information.

12. The method according to claim 6, further comprising:

receiving, by the UE, in a primary cell of the serving cell group through the a RRC signaling, dedicated physical uplink control channel (PUCCH) configuration information that is corresponding to the UE.

13. The method according to claim 6, further comprising:

receiving, by the UE, a third message from the base station, wherein the third message comprises a field corresponding to the secondary serving cell group, and the field comprises cell indexes of the primary cell and a secondary cell in the secondary serving cell group and an identifier of the secondary serving cell group, wherein the primary cell and the secondary cell belonging to the secondary serving cell group are derived from a single base station.

14. The method according to claim 6, further comprising:
allowing cross-carrier scheduling in a same serving cell group; and
not allowing cross-carrier scheduling in different serving cell groups, so that uplink information transmitted by the UE directly arrives at a corresponding base station.

15. An uplink information transmission method, comprising:
receiving, by a user equipment (UE) from a base station, a first message for adding a first serving cell and a second message for adding a second serving cell, wherein the first serving cell belongs to a master serving cell group when a identifier of a serving cell group to which the first serving cell belongs is not described in the first message, wherein the second serving cell belongs to a secondary serving cell group when the second message comprises a field indicating the secondary serving cell group to which the second serving cell belongs;
locally configuring, by the UE, the master serving cell group according to the first message and secondary serving cell group according to the second message, wherein a primary cell of the master serving cell group is configured with a cell index being a preset value;
determining, by the UE, when there is uplink information to be transmitted, a serving cell group corresponding to the uplink information; and
sending, by the UE, the uplink information to a base station through a serving cell in the serving cell group corresponding to the uplink information,
wherein when the serving cell group corresponding to the uplink information is the secondary serving cell group, the uplink information is sent through a primary cell of the serving cell group, and when the serving cell group corresponding to the uplink information is the master serving cell group, the uplink information is sent through the primary cell of the master serving cell group.

16. The method according to claim 15, wherein determining the serving cell group corresponding to the uplink information comprises:
determining, when the uplink information is a hybrid automatic repeat request-acknowledgement (HARQ-ACK), that a serving cell group to which a serving cell belongs is the serving cell group corresponding to the uplink information, wherein physical downlink shared channel (PDSCH) transmission corresponding to the HARQ-ACK is in the serving cell; or
determining, when the uplink information is a scheduling request (SR), that a serving cell group to which a serving cell, associated with a requested-for-transmission Media Access Control (MAC) protocol data unit (PDU), belongs is the serving cell group corresponding to the uplink information; or
determining, when the uplink information is periodic channel state information (CSI), that a serving cell group to which a serving cell, to which the periodic CSI belongs, belongs is the serving cell group corresponding to the uplink information.

17. The method according to claim 15, wherein determining the serving cell group corresponding to the uplink information comprises:
determining, when the uplink information is a buffer status report (BSR), that a serving cell group to which a serving cell, associated with an uplink logical channel corresponding to the BSR, belongs is the serving cell group corresponding to the uplink information; or
determining, when the uplink information is a power headroom report (PHR), that a serving cell group to which a serving cell, associated with the PHR, belongs is the serving cell group corresponding to the uplink information.

18. The method according to claim 15, further comprising:
receiving, by the UE, in a primary cell of the serving cell group through the a RRC signaling, dedicated physical uplink control channel (PUCCH) configuration information that is corresponding to the UE.

19. The method according to claim 15, further comprising:
receive, by the UE, a third message from the base station, wherein the third message comprises a field corresponding to the secondary serving cell group, and the field comprises cell indexes of the primary cell and a secondary cell in the secondary serving cell group and an identifier of the secondary serving cell group, wherein the primary cell and the secondary cell belonging to the secondary serving cell group are derived from a single base station.

* * * * *